April 14, 1942.          J. J. FERLIN          2,279,306
PNEUMATIC CONVEYING MEANS
Filed Aug. 4, 1940          4 Sheets-Sheet 1
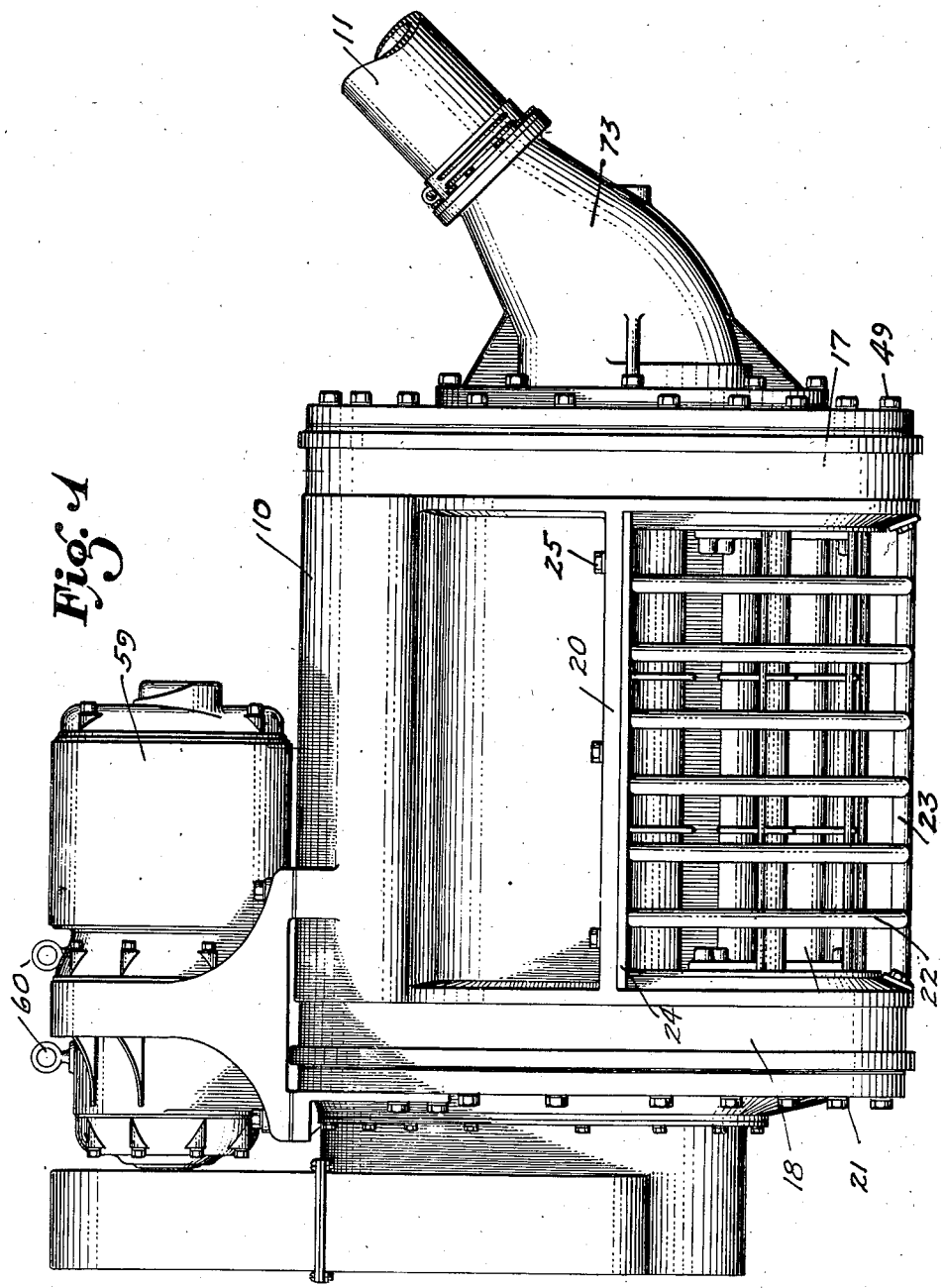
INVENTOR
BY JOHN JOSEPH FERLIN
ATTORNEY

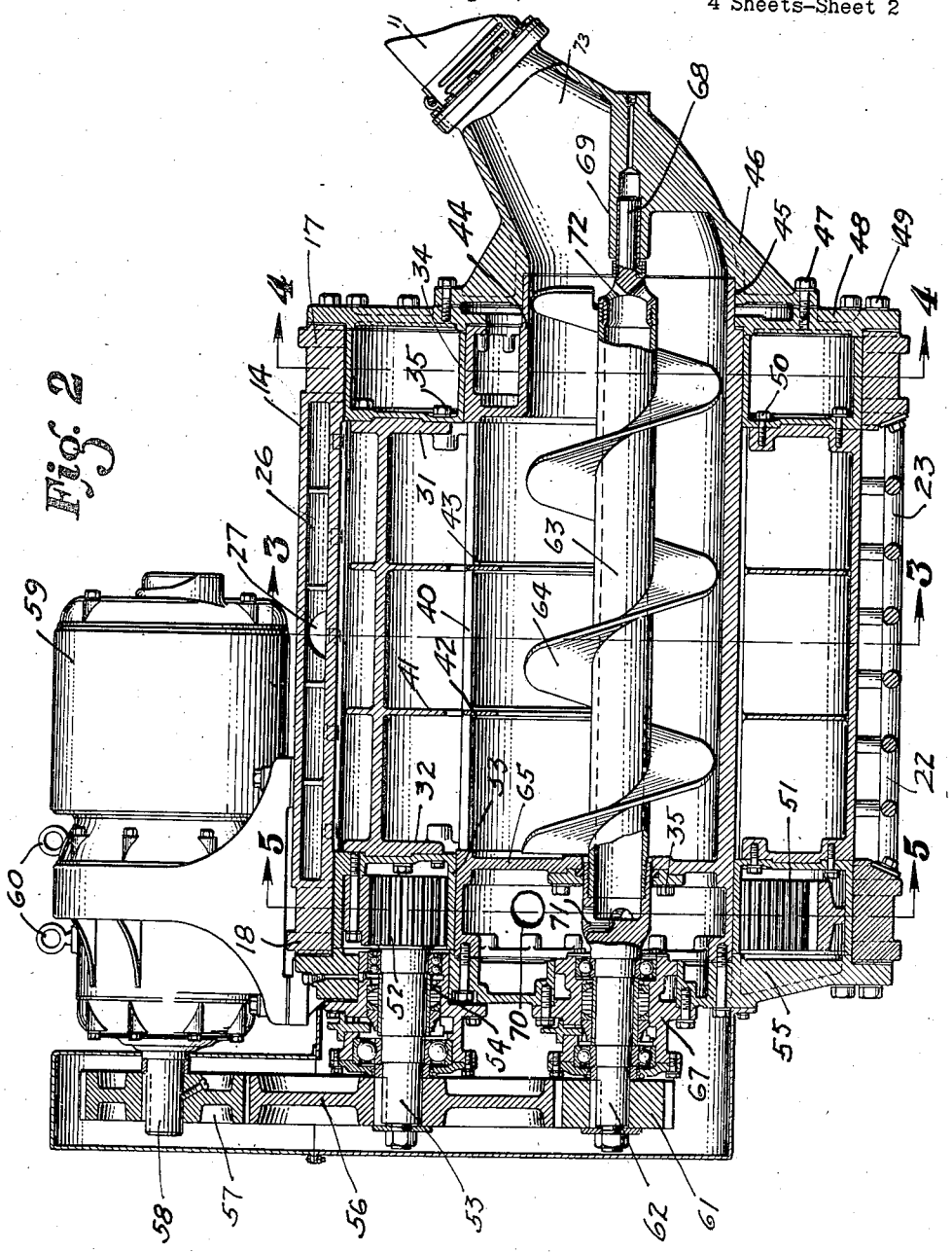

April 14, 1942.　　　J. J. FERLIN　　　2,279,306
PNEUMATIC CONVEYING MEANS
Filed Aug. 4, 1940　　　4 Sheets-Sheet 3
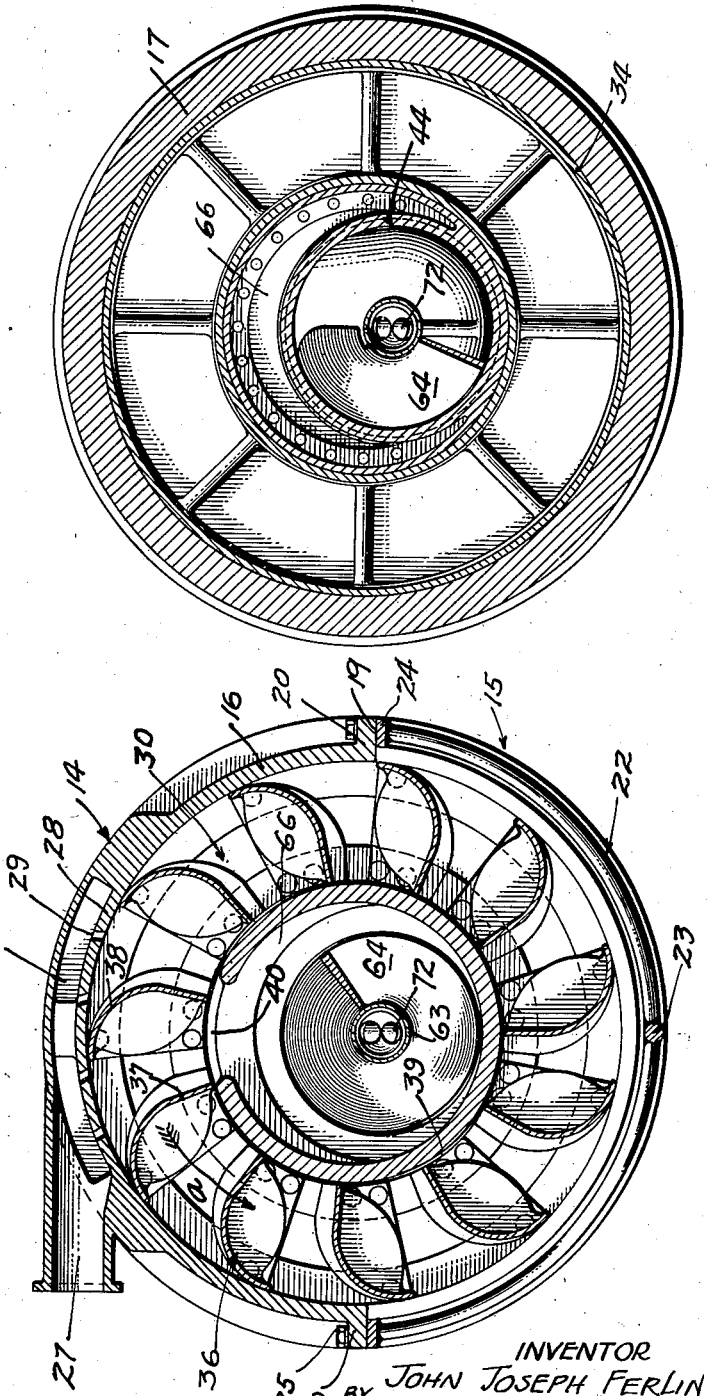
INVENTOR
JOHN JOSEPH FERLIN
BY James M. Abbett
ATTORNEY April 14, 1942.  J. J. FERLIN  2,279,306
PNEUMATIC CONVEYING MEANS
Filed Aug. 4, 1940  4 Sheets-Sheet 4

INVENTOR
BY JOHN JOSEPH FERLIN
James M. Abbett
ATTORNEY

Patented Apr. 14, 1942

2,279,306

UNITED STATES PATENT OFFICE 2,279,306

PNEUMATIC CONVEYING MEANS

John Joseph Ferlin, Los Angeles, Calif., assignor, by direct and mesne assignments, to Ed Westberg and Louis L. Swarthe, trustees Application August 4, 1940, Serial No. 351,318

8 Claims. (Cl. 302—17)

This invention relates to conveying means and particularly pertains to pneumatic conveying means.

In the handling of comminuted materials, such as sand, gravel, grains, copra and the like, these materials are often conveyed in bulk, as for example when copra or grains are conveyed in the hold of a ship or in freight cars, and in instances where they have been accumulated in storage bins and are to be transferred from place to place. At the present time this is a task which requires considerable labor and is decidedly expensive, since labor union regulations have prescribed that the material must be placed in containers while, for example, in the hold of a ship and must thereafter be carried from the ship in the containers by hoisting mechanism and then moved by stevedores to the dock where the containers may be emptied into a bin if desired. In view of the fact that ships and freight cars must be loaded and unloaded rapidly, it is desirable to convey the material from the hold of the ship to storage bins, or vice versa, with as little delay as possible. It is the principal object of the present invention, therefore, to provide portable means which may be easily moved from place to place such as when lowered into the hold of a ship or into a storage bin, and which portable means will act to gather material to be conveyed and to thereafter conduct it through suitable conveying conduits by pneumatic means to a remote point of placement, the structure being simple and effective in operation, self-loading, and is designed so as to insure that the material conveyed thereby will not only be discharged at a remote point but may be elevated to any desired height required in the transfer of the material from one point to another.

The present invention contemplates the provision of a conveying unit which may be disposed at a point of rest on bulk material to be conveyed, and which structure will then act to gather in the material, thereafter imparting a mechanical conveying action to it, as well as a pneumatic conveying action, so that the material will be forced into and through a conduit to a point of discharge.

The invention is illustrated by way of example in the accompanying drawings, in which:

Figure 1 is a view in side elevation showing the complete unit with which the present invention is concerned.

Fig. 2 is a view in central vertical section through the structure as seen on the line 2—2 of Fig. 5.

Fig. 3 is a view in transverse section through the structure as seen on the line 3—3 of Fig. 2, and shows the arrangement of the gathering blades.

Fig. 4 is a view in transverse section as seen on the line 4—4 of Fig. 2 and shows the end chamber.

Figure 6:
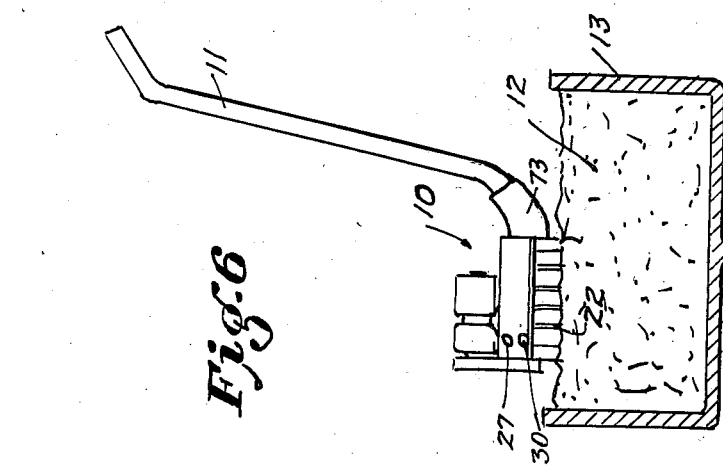
Fig. 6 is a view drawn at a reduced scale and indicates the application of the present invention showing the manner in which the structure is positioned to rest on a quantity of bulk material and to gather this material.
Figure 5:
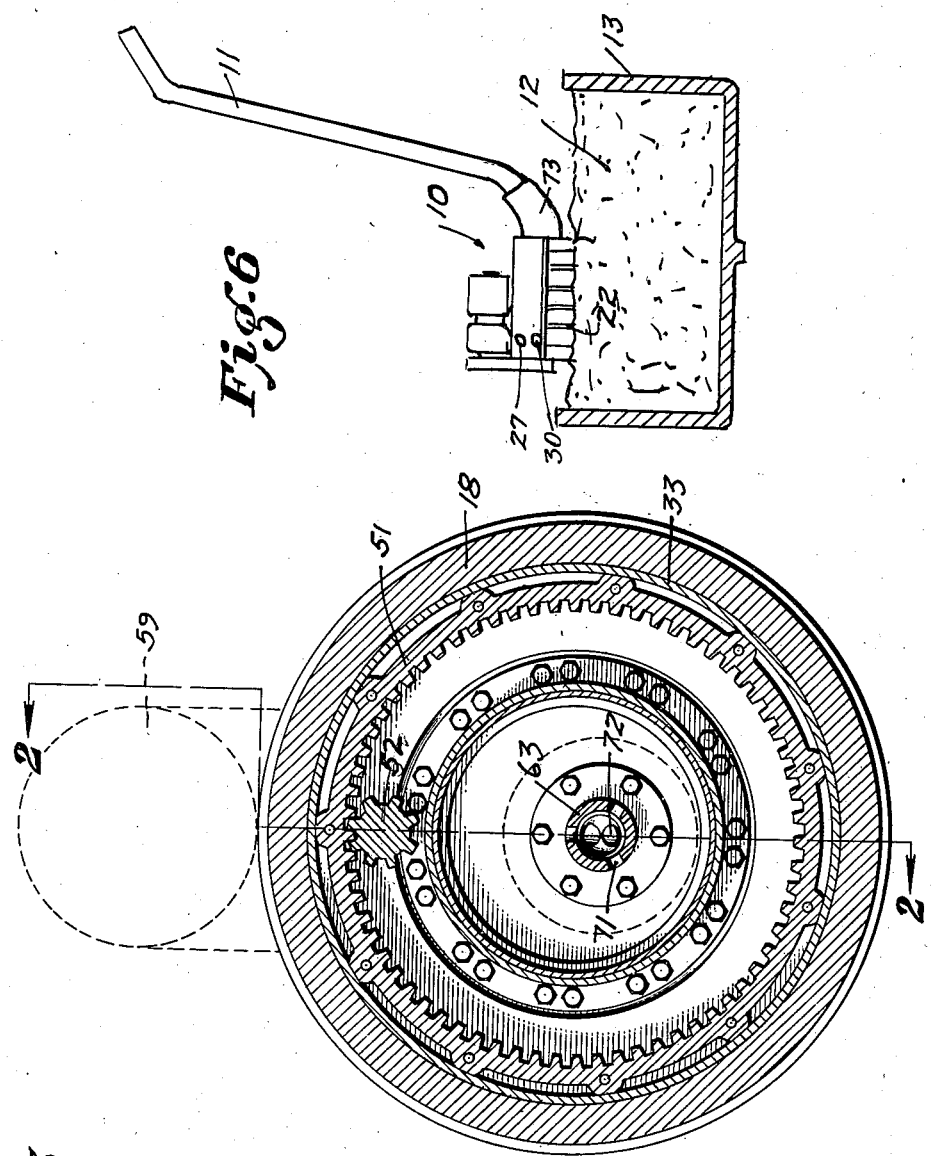
Fig. 5 is a view in transverse section through the structure as seen on the line 5—5 of Fig. 2 and shows the gear drive arrangement and indicates by dotted lines the position of the driving motor.

Referring more particularly to the drawings, 10 indicates the gathering and conveying structure with which the present invention is concerned. A conduit 11 leads therefrom to a suitable point of discharge. In Fig. 6 a body of finely divided material, such as grain, is indicated at 12, and is shown as held in a barge or the like 13 from which the material is elevated to the point of discharge.

The gathering and conveying device comprises an outer housing which includes an upper semi-cylindrical section 14 and a lower guard section 15. The upper housing section is formed with a semi-cylindrical wall 16 carrying annular end sections 17 and 18. The annular end sections 17 and 18 are continuous and are concentric with each other. These sections occur at opposite ends of the semi-cylindrical section. On the horizontal median plane of the structure are faces 19 defined by bolting flanges 20. A space occurs between the annular members 17 and 18 and below the faces 19, as indicated at 21. This provides a semicircular opening through which the material to be conveyed gains access to the gathering and conveying structure, as will be hereinafter described. This semicircular open space is partially closed by a grillwork which includes a plurality of parallel spaced grill rods 22 and a longitudinally disposed grill rod 23. The longitudinally disposed grill rod 23 extends from the annular member 17 of the housing to the annular member 18 while the grill rods 22 extend circumferentially from the grill rod 23 to bolting plates 24 which are secured to the bolting flanges by cap screws 25. It will be understood that the space between the various grill rods 22 is such as to insure that the material which is to be gathered and conveyed may pass freely between the grill rods and into the gathering means of the device. It will also be recognized due to this arrangement that the entire structure 10 may be disposed to rest upon a mass of material which is to be conveyed, and that the structure will in effect burrow its way down into the mass of material as the mass of material is carried away. It is not necessary, therefore, to provide laborers to feed the material into the machine. The annular members 17 and 18, as shown particularly in Fig. 2 of the drawings, are relatively heavy and will support the structure on the mass of material to be conveyed. The upper semicircular member of the housing is provided with a longitudinally extending arcuate air chamber 26, which, as shown in Fig. 2 of the drawings, extends from the annular member 17 to the annular member 18. An air induction pipe 27 communicates with this chamber and supplies air under pressure for a purpose to be hereinafter described. The air is delivered at a pressure of approximately 70 pounds per square inch, although other pressures might be used.

Formed through an inner wall 28 of the semicircular housing section 14 is a plurality of air ducts 29. These ducts are inclined to a radius line of the housing, the inclination being counter to the direction of rotation of a gathering structure 30 which will be hereinafter described. The gathering structure 30 includes opposite annular end plates 31 and 32. These plates are secured to annular channel-shaped bearing supports 33 and 34. Suitable bolts 35 are provided to secure the members together. The gathering means is formed with a plurality of longitudinally extending blades 36, as particularly shown in Fig. 3 of the drawings. These blades extend radially, as indicated at 37, and then are curved as indicated at 38, the curvature being in the direction of the rotation of the gathering structure. The tips of the blades describe a circle substantially that represented by the inner face of the housing wall 28. By reference to Fig. 3 it will be seen that while the gathering blades move in the direction of the arrow a, they will pursue a semicircular path of travel which is directly above the grill structure comprising members 22 and 23, and that as the grill rods settle down into the material upon which the gathering and conveying structure rests the blades will tend to gather the loose material passing between the rods and will cause it to be drawn away from the area upon which the structure is resting so that other material may fill in from the sides and be continuously fed to the device. The gathering blades 36 do not represent the entire radial length of the interior of the housing structure from its center to its circumferential wall but are arranged to travel around a tubular conveyor cylinder 39. This cylinder is shown in Fig. 3 of the drawings as having a wall formed with a feed throat 40 through it in its uppermost area. The feed throat 40 extends longitudinally of the cylinder and permits material gathered by the blades 36 to be dumped through the feed throat 40 and into the cylinder 39 for a purpose to be hereinafter described. The blades 36 are reinforced at points in their length by transverse webs 41. These webs extend downwardly through slots 42 in the cylinder 39 as indicated at 43. This insures that the material gathered by the blades 36 will be distributed uniformly through the throat 40. At the discharge end of the housing the cylinder 39 is provided with an eccentrically disposed tubular projection 44 which extends outwardly and is supported in a counterbore 45 of a discharge fitting 46. The fitting 46 is secured by bolts 47 to an end plate 48. The end plate 48 is secured by cap screws 49 to the end of the housing ring 17. The annular channel shaped support 34 circumscribes the extending end of the cylinder 39. The channel 34 is fastened to the end plate 31 of the gathering structure by cap screws 50 and rotates with the gathering structure around the axis of the cylinder 39. The opposite end of the gathering structure which carries the annular channel 34 is fitted with an internal ring gear 51, as shown in the drawings. In mesh with this gear is a driving pinion 52 by which the ring gear and the gathering structure are caused to rotate in the direction of the arrow a, as indicated in Fig. 3. The pinion 52 is mounted upon a shaft 53 carried in suitable bearings 54. These bearings are supported in the end plate 55 which is secured to the annular portion 18 of the housing. Mounted on the outer end of the shaft 53 is a gear 56 which is in mesh with the gear 57. The gear 57 is mounted upon shaft 58 of a driving motor 59. The driving motor is mounted upon the top of the housing structure 14 and is secured therewith so that the entire gathering and conveying means may be lifted bodily and moved from place to place. Suitable hoisting rings 60 are secured to the motor and are so disposed as to insure that the load of the motor and the entire conveying device will be properly balanced when the conveying structure is lifted.

The gear 56 is in mesh with a pinion 61. This pinion is mounted upon the end portion 62 of a screw conveyor shaft 63. The screw conveyor shaft extends longitudinally through the conveyor cylinder 39 but is disposed eccentrically to the longitudinal axis of this chamber and is offset downwardly in the vertical plane occupied by the axis of the cylinder 39 so that the outer edge of the conveyor screw 64 at its lowermost point of travel will be close to and directly above the lower inner face of the cylinder 39. The screw conveyor shaft is, however, mounted off center with relation to the center of extension 44 of the cylinder 39 and extends from the end wall 65 to a point adjacent the outer end of the extension 44. By this arrangement, particularly as shown in Figs. 3 and 4 of the drawings, it will be evident that a substantially crescent shaped space 66 will occur within the cylinder 39 and above the outer circumferential face of the screw 64. This will afford considerable space within which the material picked up by the gathering device and fed into the cylinder 39 through the throat 40 may pass without possibility of becoming choked in the structure or causing the device to be clogged during operation. The end 62 of the conveyor shaft 63 adjacent to the pinion 61 is supported in a suitable bearing 67. The opposite end is reduced in diameter as indicated at 68 and is rotatably supported in the discharge fitting 46.

The portion of the shaft 63 between the ends 62 and 68 is tubular and receives air under pressure which is conducted through the shaft to the discharge fitting 46. The air under pressure is delivered through an opening 70 connected with a suitable conduit leading to a source of air supply. Openings 71 formed through the end of the tubular shaft 63 adjacent to the shaft section 62 permit air to pass into the shaft. At the opposite end of the shaft 63 are openings 72. These openings are inclined and extend divergently so that jets of air will be projected into the mass of material which is being moved forwardly from the end of the screw propeller and into the throat 73 of the discharge fitting 46. The discharge fitting 46 has a diameter at its inner end agreeing with the diameter of the extension 44 of the cylinder 39. The outer end of the discharge fitting is reduced in diameter and thus provides a constricted passageway into which the air under pressure and the suspended solids are forced. The outer end of the discharge fitting 46 carries the flexible conduit 11 which may be led to any suitable point of discharge. The source of air under pressure is also connected by a conduit to the connection 27 by which it is forced into the chamber 26.

In operation of the present invention the structure is assembled as here shown and is provided with electric connections for the motor 59 leading from a suitable source of electric supply and conduits from a source of pneumatic supply which connect with the members 27 and 70. The structure is then caused to rest upon the mass of divided material 12, such as grain, copra, or other materials, at which time the weight of the structure will cause the grill rods to become imbedded in the material to be conveyed so that the blades 36 will scoop this material up and carry it in the direction of the arrow $a$ to a point where it will fall through the throat 40 and into the cylinder 39. The gathering blades are traveling at approximately 10 R. P. M. The material will be aided in its movement through the throat 42 by air passing through the jet openings 29 in the wall 28 of the upper housing 14. This air, as previously stated, has been delivered through a conduit to the connection 27, and it has been found that a suitable pressure for the air would be of the order of 70 pounds. It will be understood that this pressure may be changed to meet different conditions. Air is also delivered through the pipe 70 to the passageway 71 of the conveyor shaft 63. Due to the fact that the blades 36 create a seal with the semi-cylindrical wall 16 of the upper housing section 14, the air which enters the upper housing section 14 through the jet openings 29 will act upon the material dumped through the throat 40 into the cylinder 39 and will tend to aerate this material, acting to suspend the material to a certain degree and insure that it will be uniformly presented to the screw conveyor blade 64. This conveyor is driven at a speed of the order of 160 R. P. M. The material will then be moved lengthwise and carried into the throat 73. Here it will be given a further impelling action by the jets of air passing outwardly through the jet openings 72 of the screw conveyor shaft 63. This material will then be conducted through the conduit 11 to the point of discharge.

It will thus be seen that the apparatus here disclosed is portable so that it may be moved easily from place to place and set in position in immediate proximity to material which is to be conveyed. It will further be noted that by the construction here disclosed it is not necessary for any intermediate handling of material from one point of storage to another or for any other conveying mechanism to be used other than the flexible conduit attached to the conveying structure. It will also be recognized that material may be easily conveyed without any injury to the material itself.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. A portable pneumatic conveying device comprising an outer housing, which has an opening in its lower side, said housing being adapted to rest upon comminuted material to be conveyed, whereby the material may pass through the opening, a chamber within said housing having an open throat in its upper side, gathering means for gathering the material passing through the opening in the housing and delivering it to said throat whereby it may be discharged into the chamber, a connection to said chamber for delivering air under pressure, and a conduit leading from the chamber and through which the material which has been delivered thereto may be conveyed by the air under pressure.

2. A portable pneumatic conveying device comprising an outer housing, which has an opening in its lower side, said housing being adapted to rest upon comminuted material to be conveyed, whereby the material may pass through the opening, a chamber within said housing having an open throat in its upper side, gathering means for gathering the material passing through the opening in the housing and delivering it to said throat whereby it may be discharged into the chamber, a connection to said chamber for delivering air under pressure, a conduit leading from the chamber and through which the material which has been delivered thereto may be conveyed by the air under pressure, and a screw conveyor within said chamber for conveying material lengthwise thereof.

3. A portable pneumatic conveying device comprising an outer housing, which has an opening in its lower side, said housing being adapted to rest upon comminuted material to be conveyed, whereby the material may pass through the opening, a chamber within said housing having an open throat in its upper side, gathering means for gathering the material passing through the opening in the housing and delivering it to said throat whereby it may be discharged into the chamber, a connection to said chamber for delivering air under pressure, a conduit leading from the chamber and through which the material which has been delivered thereto may be conveyed by the air under pressure, a screw conveyor within said chamber for conveying material lengthwise thereof, and a self-contained power unit carried upon the housing of the structure and driving the gathering means and the screw conveyor.

4. A portable pneumatic conveying device comprising a substantially cylindrical housing structure adapted to rest upon a mass of comminuted material in bulk, a grill forming the lower wall portion of said housing whereby material upon which the structure rests may pass through the grill openings and into the housing, a centrally disposed conveyor chamber within said housing and extending longitudinally thereof, said chamber having an opening in its upper wall, gathering means within the housing and moving around the conveyor chamber whereby material which has passed through the grill into the housing will be engaged and carried upwardly to be discharged through the opening into the conveying cylinder, a connection for delivering air under pressure to the housing adjacent its top, jet openings for directing jets of air under pressure into said housing and through the opening in the wall of the conveying cylinder, whereby the material discharged from the gathering means will be moved into and through the conveying cylinder, and a conduit connected with the end of the conveying cylinder and through which the air under pressure will carry the material to be conveyed.

5. A portable pneumatic conveying device comprising a substantially cylindrical housing structure adapted to rest upon a mass of comminuted material in bulk, a grill forming the lower wall portion of said housing whereby material upon which the structure rests may pass through the grill openings and into the housing, a centrally disposed conveyor chamber within said housing and extending longitudinally thereof, said chamber having an opening in its upper wall, gathering means within the housing and moving around the conveyor chamber whereby material which has passed through the grill into the housing will be engaged and carried upwardly to be discharged through the opening into the conveying cylinder, a connection for delivering air under pressure to the housing adjacent its top, jet openings for directing jets of air under pressure into said housing and through the opening in the wall of the conveying cylinder, whereby the material discharged from the gathering means will be moved into and through the conveying cylinder, a conduit connected with the end of the conveying cylinder and through which the air under pressure will carry the material to be conveyed, and driving means included as a part of said device for actuating the gathering means.

6. A portable pneumatic conveying unit comprising a housing structure formed with a pair of ring members spaced apart and disposed upon a horizontal axis, an upper semi-cylindrical wall section disposed between said rings and lying in the plane above the axis, a semi-cylindrical grill disposed between the rings and lying in the plane below the axis, said assembled structure being designed to rest with the grillwork bearing upon a mass of bulk comminuted material to be conveyed, a conveying cylinder disposed centrally of the structure and enclosed within the housing formed by the semi-cylindrical section and the grill, said conveying cylinder being of a diameter considerably less than that of the housing whereby an annular space will occur around the conveying cylinder, a gathering unit including a plurality of circumferentially spaced and longitudinally extending blades mounted to travel in said annular space and to gather material passing through the grill beneath the conveying cylinder and carrying it upwardly to a point above the conveying cylinder, a throat through the upper wall of the conveying cylinder and into which the material from the gathering blades may be discharged as the gathering blades travel across said opening, an air chamber formed in the upper wall of the housing above said throat and being connected with a source of air under pressure, jet openings formed through the wall of said chamber to direct air downwardly across the annular space occurring between the housing and the cylinder and whereby pneumatic pressure will be built up within the cylinder, and a discharge conduit connected with said cylinder through which material may be conveyed.

7. A portable pneumatic conveying unit comprising a housing structure formed with a pair of ring members spaced apart and disposed upon a horizontal axis, an upper semi-cylindrical wall section disposed between said rings and lying in the plane above the axis, a semi-cylindrical grill disposed between the rings and lying in the plane below the axis, said assembled structure being designed to rest with the grillwork bearing upon a mass of bulk comminuted material to be conveyed, a conveying cylinder disposed centrally of the structure and enclosed within the housing formed by the semi-cylindrical section and the grill, said conveying cylinder being of a diameter considerably less than that of the housing whereby an annular space will occur around the conveying cylinder, a gathering unit including a plurality of circumferentially spaced and longitudinally extending blades mounted to travel in said annular space and to gather material passing through the grill beneath the conveying cylinder and carrying it upwardly to a point above the conveying cylinder, a throat through the upper wall of the conveying cylinder and into which the material from the gathering blades may be discharged as the gathering blades travel across said opening, an air chamber formed in the upper wall of the housing above said throat and being connected with a source of air under pressure, jet openings formed through the wall of said chamber to direct air downwardly across the annular space occurring between the housing and the cylinder and whereby pneumatic pressure will be built up within the cylinder, a discharge conduit connected with said cylinder through which material may be conveyed, and a screw conveyor within said cylinder moving the material toward the discharge end thereof.

8. A portable pneumatic conveying unit comprising a housing structure formed with a pair of ring members spaced apart and disposed upon a horizontal axis, an upper semi-cylindrical wall section disposed between said rings and lying in the plane above the axis, a semi-cylindrical grill disposed between the rings and lying in the plane below the axis, said assembled structure being designed to rest with the grillwork bearing upon a mass of bulk comminuted material to be conveyed, a conveying cylinder disposed centrally of the structure and enclosed within the housing formed by the semi-cylindrical section and the grill, said conveying cylinder being of a diameter considerably less than that of the housing whereby an annular space will occur around the conveying cylinder, a gathering unit including a plurality of circumferentially spaced and longitudinally extending blades mounted to travel in said annular space and to gather material passing through the grill beneath the conveying cylinder and carrying it upwardly to a point above the conveying cylinder, a throat through the upper wall of the conveying cylinder and into which the material from the gathering blades may be discharged as the gathering blades travel across said opening, an air chamber formed in the upper wall of the housing above said throat and being connected with a source of air under pressure, jet openings formed through the wall of said chamber to direct air downwardly across the annular space occurring between the housing and the cylinder and whereby pneumatic pressure will be built up within the cylinder, a discharge conduit connected with said cylinder through which material may be conveyed, a screw conveyor within said cylinder moving the material toward the discharge end thereof, means for delivering jets of air to the discharge end of the screw conveyor, and a unitary drive structure by which the gathering means and the screw conveyor are driven.

JOHN JOSEPH FERLIN.